United States Patent [19]

Yang

[11] Patent Number: 5,386,897
[45] Date of Patent: Feb. 7, 1995

[54] DELAY RESTORING TYPE LIMIT-TORQUE COUPLING MECHANISM

[76] Inventor: Tai-Her Yang, 5-1 Taipin St., Si-Hu Town, Dzan-Hwa, Taiwan, Prov. of China

[21] Appl. No.: 67,965

[22] Filed: May 27, 1993

[51] Int. Cl.⁶ ............................................. F16D 7/06
[52] U.S. Cl. ................................ 192/56 R; 192/71; 192/150; 464/37; 464/46
[58] Field of Search ................ 192/56 R, 71, 150; 464/35, 36, 37, 45, 46

[56] References Cited

U.S. PATENT DOCUMENTS

| | | | |
|---|---|---|---|
| 2,601,012 | 6/1952 | Wolff | 192/56 R |
| 2,637,987 | 5/1953 | Hill et al. | 192/56 R X |
| 3,240,304 | 3/1966 | Wickersham | 192/56 R |
| 3,488,980 | 1/1970 | Burrough | 192/56 R X |
| 3,979,925 | 9/1976 | Kato | 192/56 R X |
| 3,984,999 | 10/1976 | Kopp | 192/56 R X |
| 4,467,902 | 8/1984 | Girguis | 192/56 R |
| 4,610,340 | 9/1986 | Helmes et al. | 192/56 R |
| 4,637,502 | 1/1987 | Mayr et al. | 192/56 R |
| 4,651,856 | 3/1987 | Skrobisch | 192/56 R |
| 4,702,359 | 10/1987 | Mancuso et al. | 192/56 R |
| 4,856,631 | 8/1989 | Okamoto et al. | 192/56 R X |

FOREIGN PATENT DOCUMENTS

| | | | |
|---|---|---|---|
| 2034420 | 6/1980 | United Kingdom | 192/56 R |
| 1142674 | 2/1985 | U.S.S.R. | 192/56 R |

Primary Examiner—Andrea L. Pitts
Attorney, Agent, or Firm—Bacon & Thomas

[57] ABSTRACT

The present invention relates to a limit-torque coupling mechanism with delay restoring function. When the relative coupling portion is forced by torque to reverse the limit-torque coupling mechanism, a delay in the restoring function to reduce noise and frictional loss arising from subsequent relative sliding is accomplished so as to restore coupling during the decrease in torque difference or speed difference. To accomplish the aforesaid function lie in that, the design of the torque coupling mechanism being forcibly reversed includes a return motion damper to produce mechanical friction damping, fluid damping or magnetic damping.

1 Claim, 4 Drawing Sheets

DELAY RESTORING TYPE LIMIT-TORQUE COUPLING MECHANISM

SUMMARY OF THE INVENTION

The present invention relates to a limit-torque coupling mechanism with delay restoring function, which is characterized in that, when the relative coupling portion is forced by a torque to reverse, the limit-torque coupling mechanism has a delay restoring function to reduce noise and frictional losses arising from subsequent relative sliding so as to restore coupling during the decrease in torque difference or speed difference. The means to accomplish the aforesaid function comprises a coupling mechanism being forcibly reversed with such characteristics as mechanical friction damping, fluid damping, magnetic damping or the like.

DETAILED DESCRIPTION OF THE INVENTION

In general the conventional limit-torque coupling device has a pre-compressed force reversing mechanism. It is understood that, when the limit-torque coupling device is situated at a normal transmission coupling state, i.e., within the scope of normal torque, the loss is extremely little; when it is situated at an over-torque and relatively sliding state, a reversing pressure is thus formed arising from the pre-compression of the over-pressure reversing mechanism whereby sliding friction loss and noise increases between the force reversing mechanism and gyrator. The present invention provides the aforesaid forced reversing mechanism with one-way or bilateral damping by means of a specific damping mechanism, and particularly the one-way is related to the direction of restoring to normal coupling from the over-torque state so as to reduce friction loss during over-torque sliding. The aforesaid limit-torque coupling mechanism with delay restoring function is characterized in that, a restoring damping effect is achieved after over-loaded reversing so as to reduce friction loss arising from residual coupling torque on the conventional limit-torque coupling device, and its delay restoring function relies on mechanical friction damping, magnetic damping, or fluid damping produced from a specific structure during the travel of displacement for limit-torque forced reversing element. Owing to a delay effect that reduces restoring displacement and restoring pressure, sliding loss after over-torque is decreased. Various basic structures and principles are as shown in FIGS. 1 thru 4.

Figure 1A:
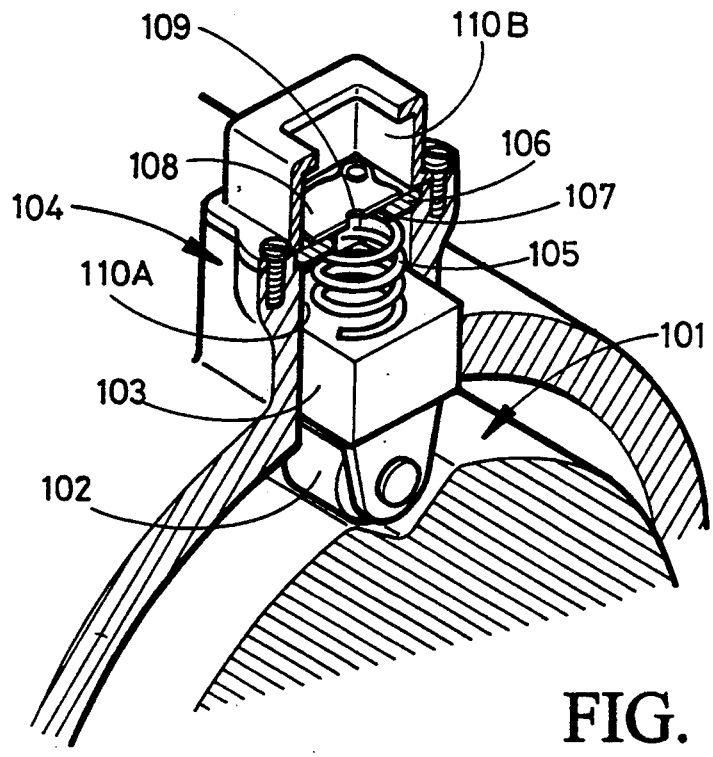
FIG. 1 is a partial perspective view showing the device of the present invention having a fluid damping type structure applied to the present limit-torque coupling mechanism with delay restoring function.
FIG. 1B is a partial, cross-sectional view of the device shown in FIG. 1A.
Figure 1B:
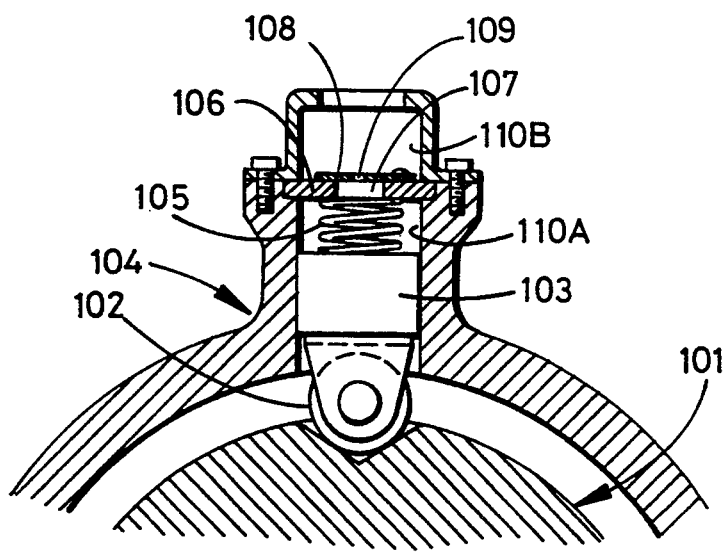

Each embodiment of the present limit-torque coupling mechanism with delay restoring function is described as below:

Referring to FIGS. 1A and 1B, the mechanism comprises:

at least one first relative motion body 101 with a groove or hole, which may resemble a shaft type, conical form or disc type, and the groove or hole thereon is provided for coupling the forced reversing mechanism 102;

at least one forced reversing mechanism 102, which may be a sliding or rolling device for normally coupling with the groove or hole on the aforesaid relative motion body 101, when the action of both does not exceed a coupling torque, it is engaged in synchronous transmission and there arises sliding or rolling differential action between with relative motion body after it is forcibly reversed;

a second relative motion body 104 which appears in motion or stoppage relatively or simultaneous motion/stoppage with the aforesaid first relative motion body 101; the second relative motion body 104 has an inner air chamber 110A for the piston 103 connected to the forced reversing mechanism 102 sliding therein so as to force a fluid, a spring 105 is provided for producing static pressure against the piston 103 and forced reversing mechanism 102;

separation wall 106 for separating and outer air chamber 110B from the inner air chamber 110A, including a guide hole 107 with a greater bore in the intermediate portion and a one-way reed 108 thereon, the one-way reed 108 having a guide hole 109 with a smaller bore.

When the aforesaid forced reversing mechanism is reversed forcibly, the piston 103 immediately compresses the fluid within the inner air chamber 110A whereby the fluid swiftly passing by the guide hole with greater bore on the wall will force the one-way reed 108 open; when the spring 105 forces the piston to return, as the one-way reed 108 is closed whereby the fluid within the outer air chamber 110B has to pass through the smaller guide hole 109 on the one-way reed 108 whereby the fluid is damped to delay the piston return, such delay function may reduce the depth and static pressure of groove or hole coupling/setting with the forced reversing mechanism and further decrease friction loss when the two relative motion bodies undergo high speed sliding.

Figure 2A:
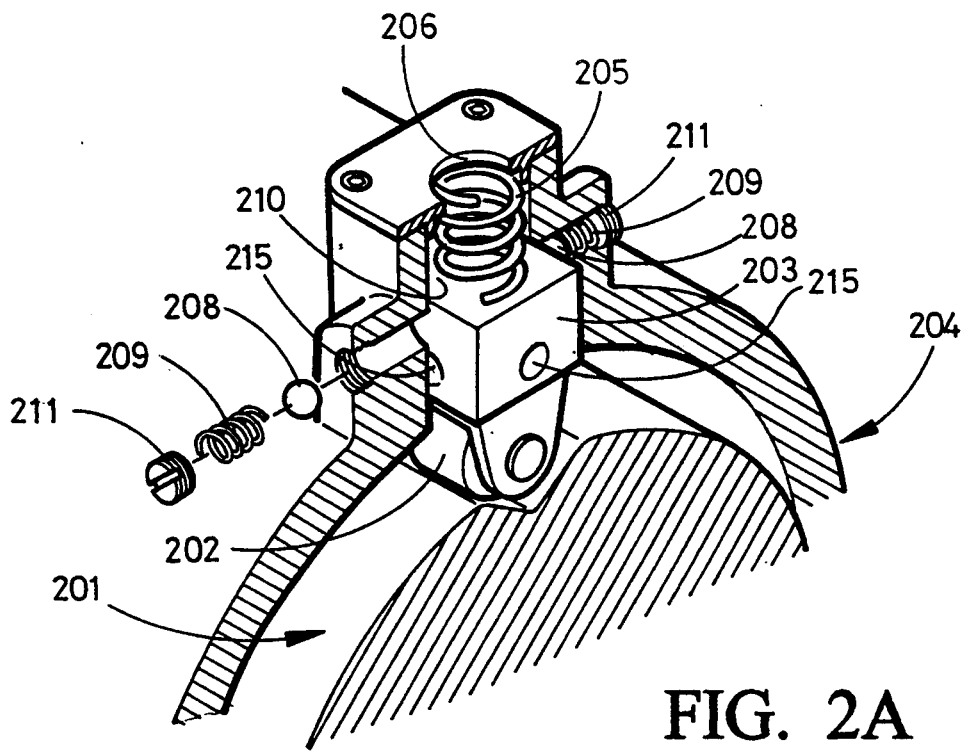
FIG. 2A is a partial perspective view of a second embodiment having a mechanical damping type structure applied to the present limit-torque coupling mechanism with delay restoring function.
Figure 2B:
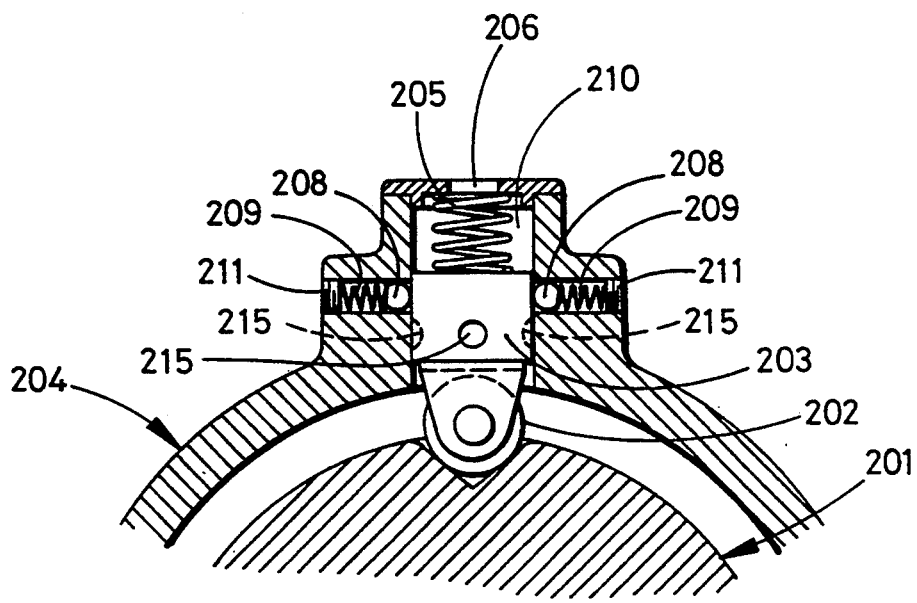
FIG. 2B is a partial cross-sectional view of the device shown in FIG. 2A.

The delay function for the aforesaid forced reversing mechanism may be accomplished by means of a gas or liquid type fluid, or friction or magnetic eddy delay effect. FIGS. 2A and 2B show an embodiment of a mechanical damping type structure applied to the present limit-torque coupling mechanism wherein it comprises:

at least one first relative motion body 201 with a groove or hole, which may resemble a shaft type, conical form or disc type, and the groove or hole thereon is provided for coupling with the forced reversing mechanism 202;

at least one forced reversing mechanism 202, which may be a sliding or rolling device for normally coupling with the groove or hole on the aforesaid relative motion body 202, when the reversing action of both does not exceed a coupling torque, it is engaged in synchronous transmission and there arises sliding or rolling differential action with the first relative motion body 201 after it is reversed forcibly;

a second relative motion body 204 which appears in motion or stoppage relatively or simultaneous motion/-stoppage with the aforesaid first relative motion body 201; the relative motion body 204 has an air chamber 210 for the piston 203 connected to the forced reversing mechanism 202 sliding therein; a spring 205 is provided for producing a static pressure against the piston 203 to set the forced reversing mechanism 202 in the groove or hole on the first relative motion body 201 so as to produce a coupling torque; there is an air hole 206 on top side of air chamber 210;

at least one transverse hole located in the side of air chamber 210 of second relative motion body 204 for incorporating a packing friction block type or ball type body 208, packing spring 209 and packing screw 211 for packing by the side of aforesaid piston 203 so as to delay the return of piston 203 once it has been upwardly displaced to decrease friction loss on the groove or hole setting between the relative motion bodies; when aforesaid piston 203 is displaced from a coupling state, the position to aforesaid packing friction block type or ball type body may engage a groove or hole 215 in the piston 203 to delay the piston return subject to the requirement, and together with aforesaid packing friction block type or ball type body to produce a damping force as damping effect to delay piston return.

Figure 3A:
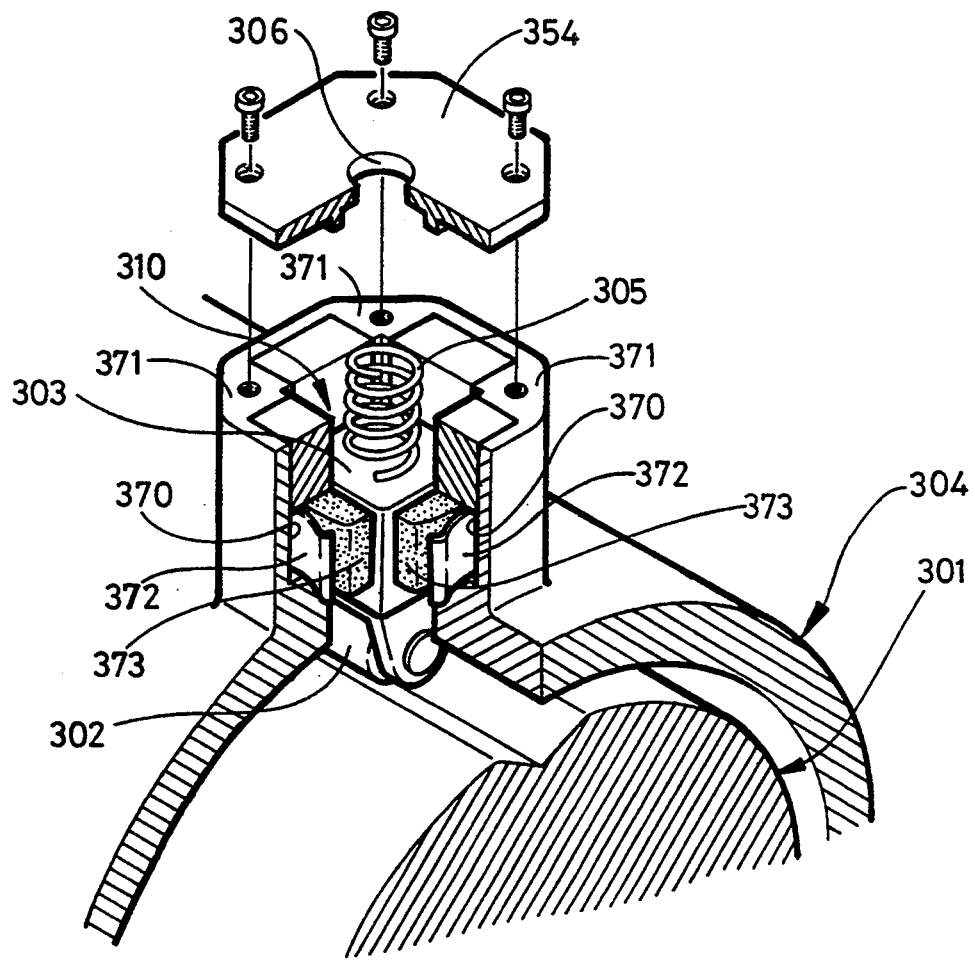
FIG. 3A is a partial perspective view of another embodiment having a mechanical damping type structure applied to the present limit-torque coupling mechanism with delay restoring function.
Figure 3B:
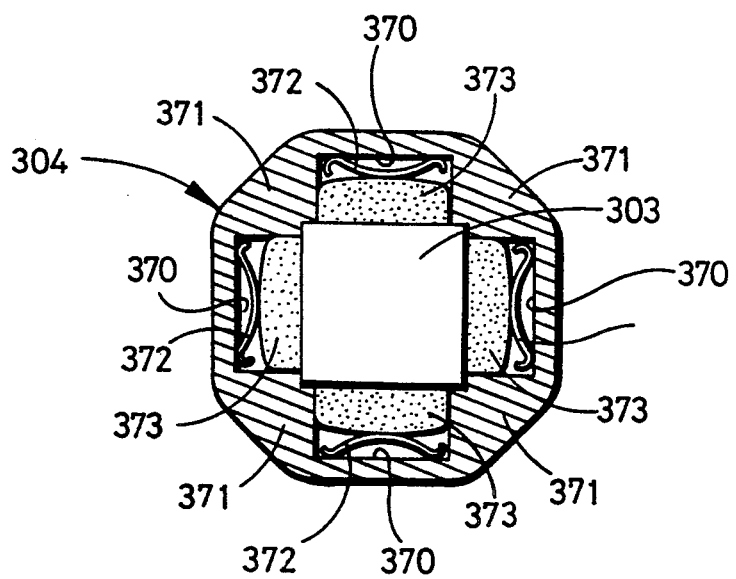
FIG. 3B is a partial top sectional view of the device shown in FIG. 3A.

FIGS. 3A and 3B illustrate another embodiment of a mechanical damping type structure applied to the present limit-torque coupling mechanism with delay restoring function wherein it comprises:

at least one first relative motion body 301 with a groove or hole, which body may resemble a shaft type, conical form or disc type, and the groove or hole thereon is provided for coupling with a forced reversing mechanism 302;

at least one forced reversing mechanism 302, which may be a sliding or rolling device for normally coupling with the groove or hole on the aforesaid first relative motion body 301, when the action of both does not exceed a coupling torque, it is engaged in synchronous transmission and there arise sliding or rolling differential action between with relative motion body after it is forcibly reversed;

a second relative motion body 304 which appears in motion or stoppage relatively or simultaneous motion/-stoppage with the aforesaid first relative motion body 301; the relative motion body 304 has an air chamber 310 for the piston 303 connected to the forced reversing mechanism 302 sliding therein; a spring 305 is provided for producing a static pressure against the piston 303 to set the forced reversing mechanism together with the groove or hole on the relative motion body 301; there is an air hole 306 on the top of air chamber 310 to prevent reversing response interference against the piston 303;

the main body of the second relative motion body 304 has recessed portions 370 for inserting a side-compression spring 372 between separation posts 371 to force a friction block 373 against the piston 303 to produce a damping function when the piston 303 is forced to return so as to reduce the depth and static pressure of groove or hole coupling/setting with the force reversing mechanism and further decreasing friction loss.

Figure 4A:
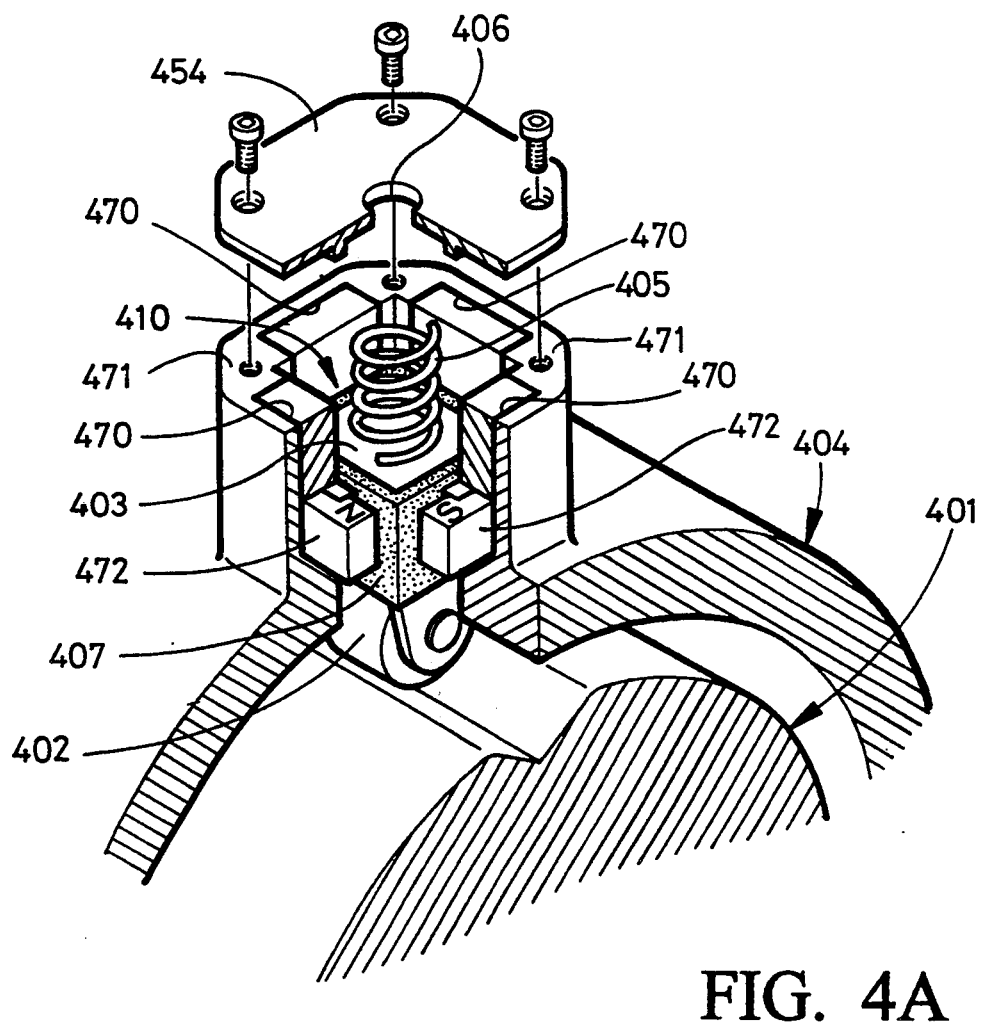
FIG. 4A is a partial perspective view of an embodiment having an eddying-effect damping type structure applied to the present limit-torque mechanism with delay restoring function.
Figure 4B:
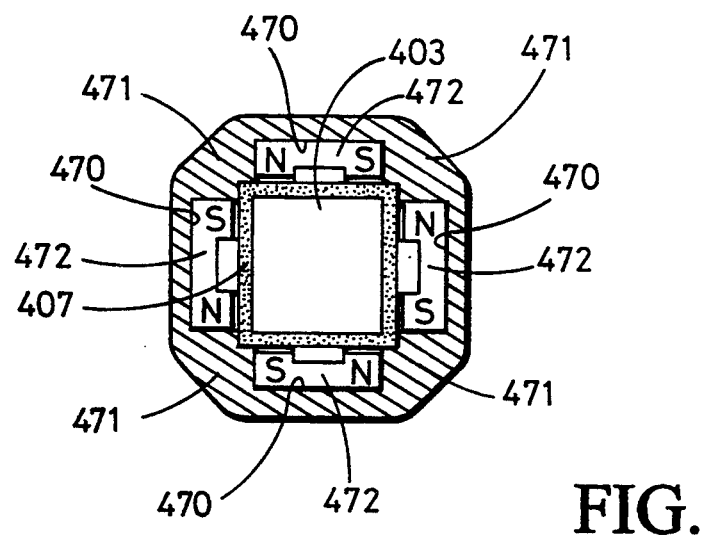
FIG. 4B is a top sectional view of FIG. 4A.

FIGS. 4A and 4B illustrate an embodiment of an eddy-effect damping type structure applied to the present limit-torque coupling mechanism with delay restoring function wherein it comprises:

at least one first relative motion body 401 with a groove or hole, which may resemble a shaft type, conical form or disc type, and the groove or hole thereon is provided for coupling with a forced reversing mechanism 402;

at least one forced reversing mechanism 402, which may be a sliding or rolling device for normally coupling with the groove or hole on the aforesaid first relative motion body 401, when the action of both does not exceed a coupling torque, it is engaged in synchronous transmission and there arises sliding or rolling differential action between with relative motion body after it is forcibly reversed;

a second relative motion body 404 which appears in motion or stoppage relatively or simultaneous motion/-stoppage with the aforesaid first relative motion body 401; the relative motion body 404 has an air chamber 410 for the piston 403 connected with the forced reversing mechanism 402 sliding therein; a spring 405 is provided for producing static pressure against the piston 403 to set the forced reversing mechanism together with the groove or hole on the relative motion body 401 and to produce a coupling torque; there is an air hole 406 on top side of air chamber 410 to prevent reversing response interference against the piston 403;

the main body of the relative motion body 404 has recessed notch portions 470 for insertion of permanent magnets 472, and separation posts 471.;

the piston 403 is enclosed by a ring type eddy damper 407 (or closed net type or railing type conductor) fabricated from a quality conductor such as copper or aluminum, for producing an eddy damping force to delay the return response of the piston 403 when the forced reversing mechanism is forcibly reversed or the spring is in restoring motion, as well as to reduce the depth and static pressure of the groove or hole coupling/setting with the forced reversing mechanism and further decrease friction loss during over-torque sliding.

Based on aforesaid descriptions, the present invention provides a new design for reducing friction losses when the conventional limit-torque coupling mechanism is over-torque sliding and to prolong the life span of coupling mechanism.

I claim:

1. A limit torque mechanism comprising:
    a) a first relative motion body defining an indentation in a surface thereof;
    b) a second relative motion body located adjacent to the first relative motion body, the second relative motion body defining: an air chamber having a first end opening towards the first relative motion body and a second end defining an air hole; and at least one recess opening into the air chamber;
    c) a forced reversing mechanism comprising: an element configured to engage the indentation on the first relative motion body; and a piston attached to the element and slidably located in the air chamber;
    d) first biasing means acting on the piston to exert a static pressure on the piston so as to urge the element into the indentation in the first relative motion body;
    e) a friction block located in the at least one recess; and
    f) second biasing means acting on the friction block so as to urge the friction block into contact with the piston so as to dampen the return movement of the piston when the element has been disengaged from the indentation.

* * * * *